United States Patent
Papineau et al.

(10) Patent No.: US 8,001,192 B1
(45) Date of Patent: Aug. 16, 2011

(54) METHOD AND APPARATUS FOR AUTOMATICALLY GENERATING CUSTOM FORMAT MESSAGES BASED ON MESSAGE-DESTINATION

(75) Inventors: Scott Papineau, Leawood, KS (US); Mary Nick-Baustert, Olathe, KS (US); Yat-Sang Hung, San Diego, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 681 days.

(21) Appl. No.: 10/878,848

(22) Filed: Jun. 28, 2004

(51) Int. Cl.
*G06F 15/16* (2006.01)
*G06F 17/00* (2006.01)
*G04B 47/00* (2006.01)

(52) U.S. Cl. ........ 709/206; 709/207; 715/205; 715/209; 715/245; 368/10

(58) Field of Classification Search .................. 709/206
See application file for complete search history.

(56) References Cited

U.S. PATENT DOCUMENTS

| | | | |
|---|---|---|---|
| 7,013,351 B2 * | 3/2006 | Bracewell et al. | 709/246 |
| 2001/0034849 A1 * | 10/2001 | Powers | 713/202 |
| 2002/0178222 A1 * | 11/2002 | O'Hara et al. | 709/205 |
| 2003/0018727 A1 * | 1/2003 | Yamamoto | 709/206 |
| 2004/0148573 A1 * | 7/2004 | Buice et al. | 715/517 |
| 2004/0179430 A1 * | 9/2004 | Bahar et al. | 368/10 |
| 2004/0186889 A1 * | 9/2004 | Washburn | 709/206 |
| 2004/0215824 A1 * | 10/2004 | Payrits | 709/245 |
| 2005/0193076 A1 * | 9/2005 | Flury et al. | 709/206 |
| 2006/0089972 A1 * | 4/2006 | Malik | 709/206 |
| 2007/0043818 A1 * | 2/2007 | Cottrille et al. | 709/206 |
| 2007/0162613 A1 * | 7/2007 | O'Neill et al. | 709/238 |

* cited by examiner

*Primary Examiner* — Phuoc Nguyen
*Assistant Examiner* — Kishin G Belani

(57) ABSTRACT

A method and apparatus for generating custom format messages. Upon user selection of a message-destination, application logic identifies a set of template customization data corresponding to the message-destination and uses the template customization data to customize a generalized message template, so as to produce a custom format message. Advantageously, a single messaging application can thereby be made to produce custom format messages respectively for many different message-destinations.

22 Claims, 3 Drawing Sheets

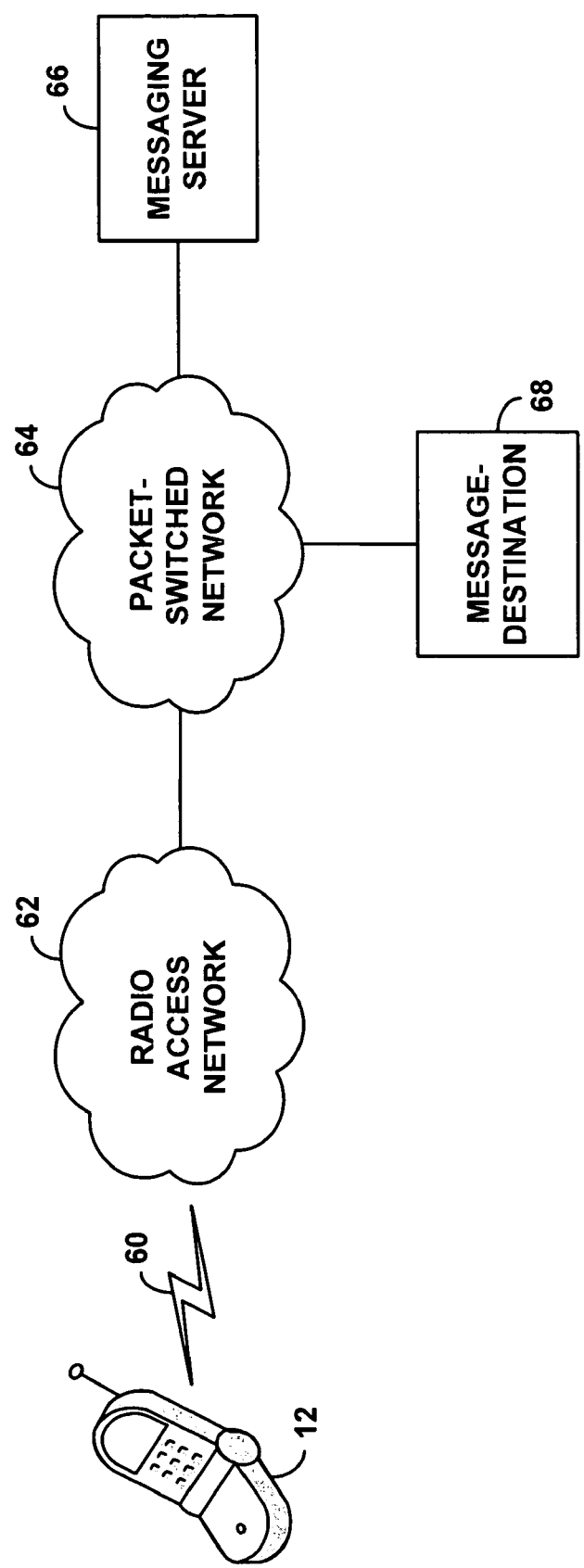

METHOD AND APPARATUS FOR AUTOMATICALLY GENERATING CUSTOM FORMAT MESSAGES BASED ON MESSAGE-DESTINATION

FIELD OF THE INVENTION

The present invention relates to telecommunications and, more particularly, to generating and sending of messages.

BACKGROUND

One of the great advantages of modern telecommunications systems is the ability for users to quickly and easily send messages (e.g., e-mail, SMS, HTTP, or other types of messages) from one location to another. Typically, for instance, a user of a client station may simply open a messaging application, invoke a new-message function, and enter pertinent data such as a message-recipient, a subject line, and message text. Further, if the messaging application permits, the user may add one or more attachments to the message. Once the user has finished generating the message, the user may then invoke a message-send function, to cause the application to send the message to the designated recipient.

For various reasons, certain message recipients may impose restrictions on the messages that they receive. For instance, a message recipient may require messages to contain only a certain type, quantity or size of attachments or only a certain quantity of text. By way of example, an online photo processing service may have an e-mail address at which the service is arranged to receive photos by e-mail from customers, and the service may require that each e-mail message to that address identify the customer in the FROM field and include one to five attached photos. As another example, a company may have an e-mail address at which the company receives customer queries by e-mail, and the company may require that each such e-mail message include up to 1,000 characters of text and no attachments. Other examples are possible as well.

If a message recipient receives a message that does not comply with its requirements (such as a message that includes the wrong type of attachments, the wrong number of attachments, or the wrong length of text, for instance), the recipient may reject the message. When that happens, the recipient may notify the sender of the problem by way of a reply message. Alternatively, the recipient may disregard the message altogether. In either instance, this can be a burden for the sender. Therefore, an improvement is desired.

SUMMARY

The present invention advances by providing a universal message composer application that automatically customizes the format of a message based on the message destination. According to a preferred embodiment, a user will select a message destination and the composer application will responsively generate a custom format message to go to the destination. More particularly, based on the destination selected by the user, the composer application may customize a generalized message template so as to include certain fields, to exclude certain fields, and/or to place certain restrictions on the contents of one or more fields, rather than just defining the values of fields.

Further, the composer application may automatically fill in one or more of the fields with default values and/or may present the customized message template to a user and allow the user to tailor the message, such as by entering or editing values in certain fields. Once the customized message is ready to send, the composer application may then output the message for transmission to the selected destination.

The invention can be arranged in various forms. By way of example, one embodiment may take the form of a machine-readable medium, such as a disk, tape, storage drive, or memory medium, that contains reference data and program instructions arranged to carry out the message customization functions. More particularly, the machine-readable medium may contain a general message template, destination data, and a composer application.

The general message template may define a plurality of message fields. And the destination data may define, for each of a plurality of message-destinations, a set of template customization data that indicates which fields of the general message template should be included in a message to the message-destination. The composer application may then be executable to carry out functions such as (i) receiving a user selection of a message-destination from the plurality of message-destinations, and (ii) generating a custom format message to the selected message-destination by customizing the message template to include just those fields that the template customization data indicates should be included in a message to the selected message-destination.

The machine-readable medium can be a standalone medium, such as a compact disc or Flash memory card, which could be inserted into a suitable reader in order to be read and used. Alternatively, or in turn, the device could be situated within a communication device, such as a wireless handheld device (e.g., cell phone, wireless personal digital assistant, etc.), a personal computer, or the like, so as to be read and used by a processor of the device to generate custom format messages based on message-destination.

Another embodiment of the invention may take the form of a device, such as a wireless handheld device or personal computer, that includes a user interface, a processor, and data storage, and, within the data storage, a general message template, a set of destination data, and a composer application as described above for instance.

And yet another embodiment of the invention may take the form of a method that includes maintaining in data storage a general message template, a set of destination data, and a composer application, also as described above. Such a method may then further include the function of executing the composer application to receive the user selection of a message-destination, and to generate the custom format message to the destination by customizing the message template to include just those fields that the template customization data indicates should be included in a message to the selected message-destination.

BRIEF DESCRIPTION OF THE DRAWINGS

FIG. 3 is a simplified block diagram of a network arrangement in which the communication device of FIG. 1 can operate.

DETAILED DESCRIPTION

Figure 1:
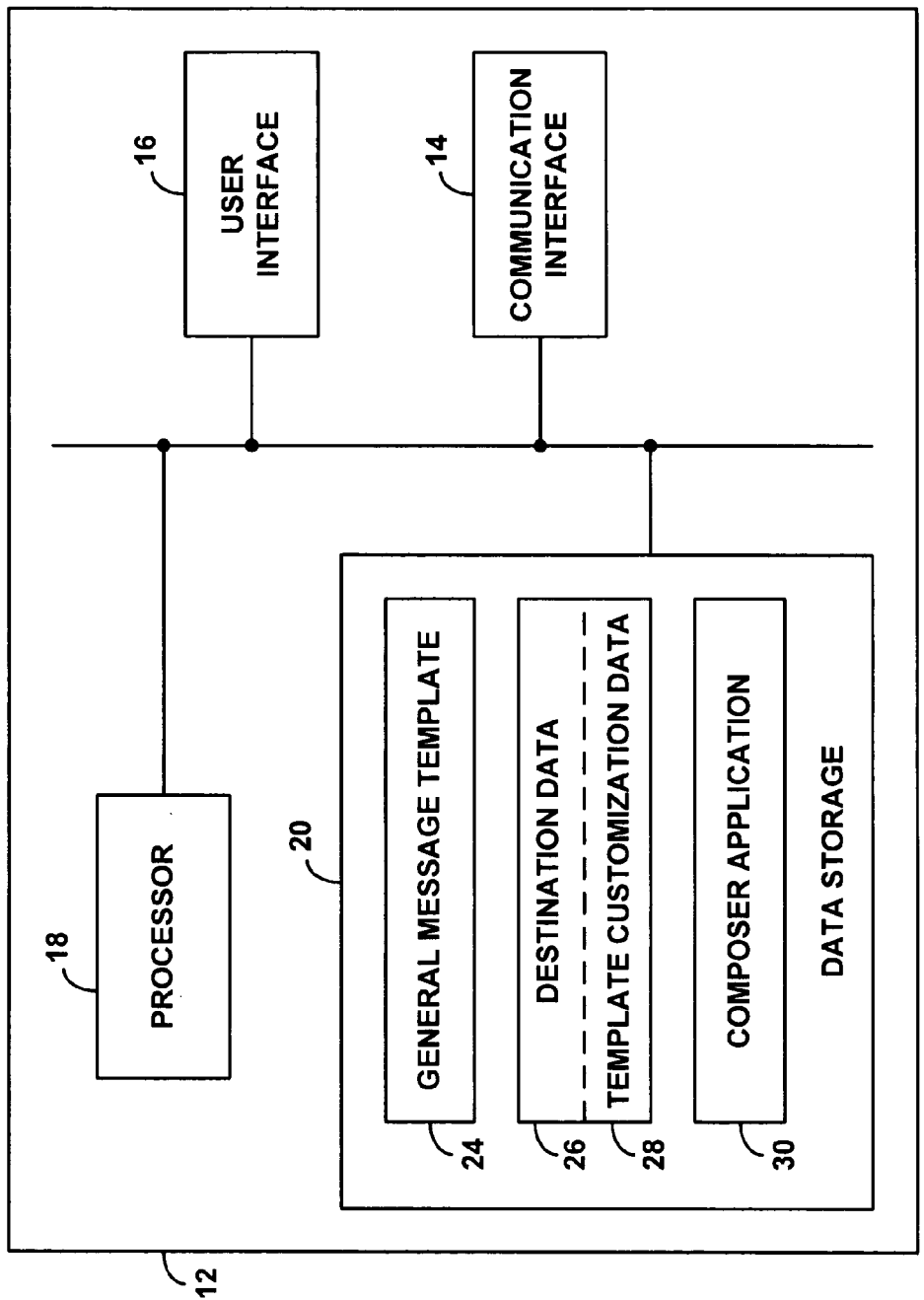
FIG. 1 is a simplified block diagram of a communication device arranged to carry out an exemplary embodiment of the invention.

Referring to the drawings, FIG. 1 is a simplified block diagram of a communication device 12 arranged to carry out an exemplary embodiment of the invention. As shown in the Figure, the device may include a communication interface 14, a user interface 16, a processor 18, and data storage 20, all of which may be coupled together by a system bus or other mechanism 22. It should of course be understood that this and other arrangements shown and described herein are provided for purposes of example only, and assorted variations are possible within the scope and spirit of the invention as claimed.

Communication device 12 can itself take various forms. As examples, without limitation, the communication device can be a personal computer such as a desktop computer or notebook computer, or the communication device can be a wireless handheld device such as a cellular telephone or wirelessly-equipped personal digital assistant (PDA). Communication device could also be a network-based device, such as a server with which a user communicates via a network connection (such as a World Wide Web session for instance). Other examples are possible as well.

Communication interface 14 is arranged to send and receive communications, such as custom format messages for instance. As such, communication interface 14 could take various forms, depending on the mechanism that the device will use to communicate. By way of example, if communication device 12 communicates via a wired local area network (LAN), communication interface 14 could be an Ethernet network interface circuit. As another example, if communication device 12 communicates wirelessly via a radio access network, communication interface 14 could be a wireless communication interface, such as a cellular chipset and antenna of the type made by Qualcomm Inc. for instance.

User interface 16 could similarly take various forms, preferably including means for presenting information to a user and means for receiving information from a user. For example, user interface 16 can include an LCD display screen and/or loudspeaker for presenting information to the user, and a keypad, dial, microphone, or touch sensitive screen layer for receiving input from a user. In operation, for instance, user interface 16 can present a list of information on a display screen, and a user can select an item from the list by scrolling to the item and engaging a keypad button.

Processor 18 can comprise one or more processors (which could work separately or in combination (e.g., parallel) with each other), such as general purpose microprocessors and/or dedicated digital signal processors or the like. Data storage 20, in turn, may include one or more data storage components, including volatile and/or non-volatile storage means, such as disk, tape, storage drive, memory or other storage means. Data storage 20 could be integrated in whole or in part with processor 18, as cache memory for instance. Further data storage 20 and the other components of communication device 12 could be add-on modules which are temporarily situated within or otherwise connected with the device.

As further shown in FIG. 1, data storage 20 preferably contains or is adapted to contain (i) a general message template 24, (ii) destination data 26 including template customization data 28, and (iii) a composer application 30. Although these components are described herein as separate data storage elements, the elements could just as well be physically integrated together or distributed in various other ways. For instance, the composer application itself could define both the general message template and the destination data as program constants. However, in a preferred embodiment, the general message template and particularly the destination data would be maintained in data storage separate from the composer application, for easy updating and reference by the composer application.

The general message template preferably defines a list of fields that can be included in messages, such that a messaging application could present the fields and associated values to a user (e.g., in series) through a graphical user interface or a plaintext display, and could send the group of fields and their associated values or referenced content as a message to a selected message-destination. By way of example, the general message template may define the following fields:

(1) MESSAGE_TITLE. A text field to be used as a message caption.

(2) TO. A destination address, such as an e-mail address, SIP address or other.

(3) FROM. A source address, in a similar form.

(4) SUBJECT. A text field to contain a subject line for the message.

(5) MESSAGE BODY. A text message (simple or complex, such as HTML).

(6) IMAGE_REFERENCE. A filename or array of filenames (e.g., multiple instances of the IMAGE_REFERENCE field) of one or more digital image files to be included as attachment(s) with the message.

(7) VIDEO_REFERENCE. A filename or array of filenames (e.g., multiple instances of the VIDEO_REFERENCE field) of one or more digital video files to be included as attachment(s) with the message.

(8) AUDIO_REFERENCE. A filename or array of filenames (e.g., multiple instances of the AUDIO_REFERENCE field) of one or more digital audio files to be included as attachment(s) with the message.

Of course, the general message template could define other fields in addition to or instead of these fields.

The general message template can define the available fields with XML or in any other desired manner. Using XML, for instance, the general message template could define each field as an element with one or more associated attributes. Example attributes can include:

(a) INCLUDE. A Boolean indication of whether or not to include the field in a message.

(b) TYPE. A text or constant value indicating what type of value the field can hold, such as Boolean, text, integer, array, attachment filename, etc.

(c) DEFAULT. A default value for the field.

(d) REQUIRED. A Boolean indication of whether a value for the field is required.

(e) PRESENT_TO_USER. A Boolean indication of whether the field and its value should be presented to the user.

(f) EDITABLE. A Boolean indication of whether a user should be allowed to edit the field value.

Further, certain types of fields may include other special attributes. For example, attributes of text fields may include:

(g) MINIMUM. A minimum number of characters that the field can contain.

(h) MAXIMUM. A maximum number of characters that the field can contain.

And as another example, attributes of fields that contain references to attachments (such as IMAGE_REFERENCE, VIDEO_REFERENCE, and AUDIO_REFERENCE) can include:

(i) MINIMUM. A minimum number of attachments permissible.

(j) MAXIMUM. A maximum number of attachments permissible.

(k) ATTACHMENT_TYPE. One or more permissible attachment types, such as filename suffixes.

The general message template can specify default values for the various field attributes that it defines. For instance, the general message template may specify a value of TRUE for the INCLUDE, PRESENT_TO_USER and EDITABLE attributes of every field, signifying that each field would normally be included by default in a message and would be presented to a user (e.g., in GUI presentation of the message template) and could be edited by the user. Further, the general message template could define other attributes and other limitations on the values that can be included in various fields.

In practice, a messaging application can use these attributes as a basis to validate the values of message fields, during generation of the message or otherwise before allowing the message to be transmitted to the selected destination. For instance, if an IMAGE_REFERENCE field of a given message has a MINIMUM value of 1 and a MAXIMUM value of 4, a messaging application may preclude transmission of the message unless the field includes designates 1, 2, 3 or 4 image files to be sent as attachments with the message.

The destination data 26, in turn, may include for each of a plurality of message-destinations a set of template customization data 28 that facilitates customization of the general message template for messages to the message-destination. As such, the destination data can be structured in any of a variety of ways. By way of example, the destination data 26 can be structured as an XML script that defines each message-destination with a destination ID (e.g., destination name) and destination address (e.g., e-mail address, SIP address, etc.), and that defines template customization data for each message-destination in the form of XML child elements under the destination ID. When the composer application receives a user selection of a message-destination, the composer application can then apply the template customization data specified by the XML child elements for that message-destination.

Alternatively, the destination data 26 could separately define the template customization data 28 as multiple template customization records, and the destination data 26 could then correlate each message-destination with a particular template customization record. For instance, the template customization data 28 could be structured as an XML script that labels each template customization record with a template-customization ID and that sets forth template customization data as child elements under the template-customization ID. And the destination data 26 can be set forth as an XML script that references a template-customization ID respectively for each message-destination.

With this alternative arrangement, when the composer application receives a user selection of a message-destination, the composer application can determine from the destination data 26 which customization record to use. And the composer application can then apply the customization instructions defined by that customization record so as to produce a custom format message to the destination. A benefit of this alternative arrangement is that more than one destination can reference a common customization record, thereby conserving resources.

In either case, the template customization data can take various forms, such as an XML script for instance. In a preferred embodiment, the template customization data specifies attribute values for the various fields defined by the general message template, which will take precedence over the attribute values (if any) defined by default by the general message template. For instance, while the general message template may permit inclusion a single IMAGE_REFERENCE value (with MINIMUM and MAXIMUM values both set to 1), a single VIDEO_REFERENCE value, and a single AUDIO_REFERENCE value, the template customization data for a given message-destination may set the INCLUDE attributes for VIDEO_REFERENCE and AUDIO_REFERENCE to be FALSE so as to prevent inclusion of any video or audio files, and may set the attributes for IMAGE_REFERENCE so as to permit 1 to 5 digital image files to be included.

The template customization data can indicate expressly or implicitly whether to include various fields defined by the general message template. For instance, the template customization data can expressly set or clear the INCLUDE attribute of a given field to indicate whether the field should be included or not included. Alternatively, the template customization data could expressly indicate just the fields that are to be included, and the message composer application could treat this as an implicit indication that the other fields should not be included.

Further, the template customization data can indicate for each field whether the field and/or and its associated value should be presented to the user as part of the message. For a given message-destination, the template customization data can indicate that a certain field should be included but should not be presented to the user for review and/or data entry/editing.

Figure 2:
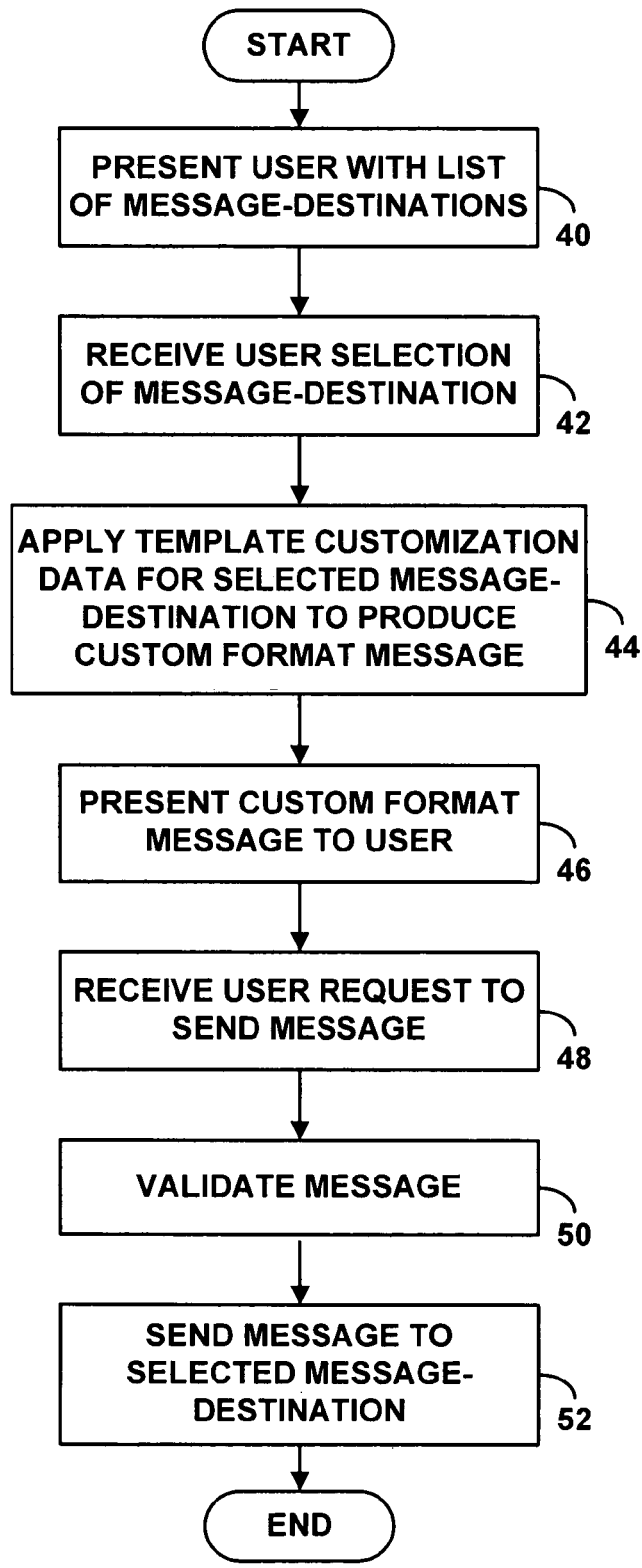
FIG. 2 is a flow chart depicting operation of a composer application in accordance with the exemplary embodiment.

The composer application 30, in turn, may take the form of a set of program logic (machine readable instructions or other form of program logic) that can be executed or interpreted by processor 18 to carry out functions of the exemplary embodiment. FIG. 2 is a flow chart depicting this functionality.

A shown in FIG. 2, at block 40, the composer application 30 (i.e., the processor 18 executing the application) presents the user with a list of available message-destinations. This function may occur when the user invokes the composer application or invokes an aspect thereof (e.g., a menu or link selection) via user interface 16 on the communication device 12. The composer application may then responsively refer to destination data 26 to obtain a listing of message-destinations, by common name (names that would be understood to the user) for instance. And the composer application may present that list of message-destinations to the user via user interface 16, on a display screen for instance.

At block 42, the user may then select a message-destination to which the user would like to send a message. For instance, the user may operate user interface 16 to scroll through the list of message-destinations and to select a desired destination.

In response, at block 44, the composer application 30 may refer to destination data 26 so as to acquire the template customization data corresponding with the selected message-destination, and the composer application 30 may then apply that template customization data to customize the general message template, so as to produce a custom format message to the message-destination. For instance, as described above, the composer application 30 may apply the field attribute values specified by the template customization data for the message-destination, in place of any field attribute values specified by the general message template. Thus, if the template customization data indicates that only certain fields of the general message template should be included in a message to the message-destination, then the composer application may include in the custom format message only those fields and not the others defined by the general message template.

At block 46, the composer application 30 may then present the resulting custom format message to the user. Given the attributes noted above by way of example, the composer application 30 may programmatically present to the user just those fields of the custom format message whose PRESENT_TO_USER attributes are set. Further, the composer may allow a user to edit the values of any of the presented fields whose EDITABLE attributes are set. For instance, if the SUB- JECT field is presented and editable, a user could type a subject string as a text value into the field.

At block 48, the composer application 30 may then receive a user request to send the resulting message. In response, at block 50, the composer application may validate the message by checking to ensure that the values entered into each field comply with the attribute restrictions defined for the field. And at block 52, the composer application may then send the message, via communication interface 14, to the selected message-destination.

As an example of this process, using the above fields and attributes, assume that a user selects as a message-destination a KODAK photo processing service, to which the user would like to send photos for printing. For that destination, the template customization data may indicate as follows:

MESSAGE_TITLE:
   Include=True
   Type=Text
   Default="KODAK"
   Present_To_User=True
   Editable=False
TO:
   Include=True
   Type=Text
   Default="Kodak Photo Printing"
   Present_To_User=True
   Editable=False
FROM
   Include=True
   Type=Text
   Default=Username {i.e., name of user operating the composer application}
   Present_To_User=False
   Editable=False
SUBJECT
   Include=True
   Type=Text
   Default="My photos"
   Present_To_User=True
   Editable=True
MESSAGE_BODY
   Include=False
IMAGE_REFERENCE
   Include=True
   Type=ImageFileReference(4) {i.e., an array of up to four image file references}
   Minimum=1 {i.e., must include at least one image file reference}
   Maximum=4 {i.e., must include no more than four image file references}
   Present_To_User=True
   Editable=True
   Attachment_Type="*.jpg, *bmp"
VIDEO_REFERENCE
   Include=False
AUDIO_REFERENCE
   Include=False Using this template customization data, the composer application may then generate a custom format message and may present the custom format message to the user (e.g., on a display screen) for the user to review and edit. In this example, the custom format message would include TITLE, TO, FROM, SUBJECT and IMAGE_REFERENCE fields. However, pursuant to the template customization data, only the TITLE, TO, SUBJECT, and IMAGE_REFERENCE fields would be presented to the user. The TITLE field would have the text value "KODAK" and would not be editable by the user. The TO field would have the text value "Kodak Photo Printing" (perhaps with an underlying e-mail address or other address) and would not be editable by the user. The FROM field would have the user's username, as determined from stored login data on the client station for instance. The SUBJECT field would have the text value "My photos" but would be editable by the user. And the IMAGE_REFERENCE field would be arranged to hold an array of one to four file references pointing to attached bitmap or JPEG image files.

Thus, the user may change the value of the SUBJECT field in this custom form message. Further, the user would enter one to four file references pointing to attached image files (such as by picking the files through a file-select dialog). Given the restriction of 1-4 image file references, the user would need to enter at least one and no more than four image file references, preferably as a prerequisite to sending the message to the Kodak destination. Thus, the composer application may programmatically preclude transmission of the message unless the user provides 1-4 image file references.

Assume next that the user selects as a message destination "Joe's Customer Service Center". For this destination, the template customization data may indicate as follows:

MESSAGE TITLE:
   Include=True
   Type=Text
   Default="Message to Joe"
   Present_To_User=True
   Editable=False
TO:
   Include=True
   Type=Text
   Default="Joe's Customer Service Center"
   Present_To_User=False
   Editable=False
FROM
   Include=True
   Type=Text
   Default=Username {i.e., name of user operating the composer application}
   Present_To_User=False
   Editable=False
SUBJECT
   Include=True
   Type=Text
   Required=True
   Present_To_User=True
   Editable=True
   Maximum=30 {i.e., up to 30 characters of text}
TEXT MESSAGE
   Include=True
   Type=Text
   Required=True
   Editable=True
   Present_To_User=True
   Maximum=500 {i.e., up to 500 characters of text}
IMAGE_REFERENCE
   Include=False
IMAGE_REFERENCE
   Include=False
IMAGE_REFERENCE
   Include=False Using this template customization data, the composer application may then generate a custom format message and may present the custom format message to the user for the user to review and edit. In this example, the custom format message would include TITLE, TO, FROM, SUBJECT and TEXT MESSAGE fields. However, pursuant to the customization data, only the TITLE, SUBJECT, and TEXT MESSAGE fields would be presented to the user. The TITLE field would have the text value "Message to Joe" and would not be editable by the user. The TO field would have the text value "Joe's Customer Service Center" (perhaps with an underlying e-mail address or other sort of address) and would not be editable by the user. The FROM field would have the user's username, as determined from stored login data on the client station for instance. The SUBJECT field would have no default value but would require user entry of a subject of up to 30 characters. And the TEXT MESSAGE field would have no default value but would require user entry of a message of up to 500 characters.

Thus, the user may enter a value of up to 30 characters into the SUBJECT field and a value of up to 500 characters into the TEXT MESSAGE field. Since the SUBJECT and TEXT MESSAGE fields require entry, the composer application may programmatically preclude transmission of the message unless the user provides a value for the SUBJECT field and a value for the TEXT MESSAGE field. Further, because the template customization data for this message-destination does not include file attachment fields, the composer application may preclude a user from sending attachments to this message-destination.

In an exemplary embodiment, the communication device 12 may operate in a network arrangement through which the communication device 12 sends outgoing messages to a network-based messaging server, and the server forwards the messages to their designated destinations. FIG. 3 depicts such an arrangement. By way of example in FIG. 3, communication device 12 is a wireless handheld device, which communicates over an air interface 60 with a radio access network (RAN) 62. RAN 62, in turn, provides connectivity with a packet-switched network 64 on which a messaging server 66 resides. Communication device 12 may be compliant with 3G or later wireless packet data protocols, so that it can engage in packet-data communication with the messaging server 66.

Once composer application 30 generates a custom format message as described above, including any user tailoring of the message as allowed or required, composer application may thus transmit the message to messaging server 66, in the form of XML over HTTP for instance. Preferably, the message would carry a destination ID indicative of the selected destination 68, and messaging server 66 would use that destination ID as a basis to route the message to the selected destination 68.

In the preferred embodiment, the destination data and customization logic on communication device 12 can be updated each time the communication device 12 registers with messaging server 56. For instance, when a user of the device first invokes the composer application or another designated application on the device, the device may automatically send a registration message to the messaging server, providing the server with a version number of the destination data that the device has stored in data storage 18. The messaging server may then check to determine whether an updated version of the destination data exists, perhaps defining new or different destinations or new or different template customization data for one or more destinations. If updated data exists, the messaging server may then provide it (in full, or as an incremental update) to the communication device in a response to the registration message, and the communication device may accordingly update its stored destination data.

A benefit of the invention is that a single composer application can be provided to facilitate special form messaging to various destinations. Thus, in a scenario where one destination can only receive certain information, and another destination can only receive certain other information, the invention avoids the need to have separate messaging applications for each destination. A single messaging application arranged in accordance with the exemplary embodiment can conveniently generate custom format messages respectively for many different message-destinations.

An exemplary embodiment of the invention has been described above. Those skilled in the art will understand, however, that changes and modifications may be made to this embodiment without departing from the true scope and spirit of the present invention, which is defined by the claims.

We claim:

1. A wireless handheld device comprising:
a processor located at the wireless handheld device;
data storage located at the wireless handheld device;
a general message template that is stored in the data storage and that defines a plurality of message fields;
destination data stored in the data storage but not contained within the general message template, wherein, for a plurality of message destinations, the destination data comprises a plurality of template customization data records, wherein each of the template customization data records has a respective template customization ID, and wherein the destination data specifies for each message-destination of the plurality of message-destinations a template customization ID of a template customization data record that corresponds to that message-destination;
a user interface located at the wireless handheld device and operable to select from the plurality of message destinations a message-destination to be sent a message, wherein the selected message-destination corresponds to a first template customization data record of the plurality of template customization data records, wherein the first template customization data record identifies (i) at least one message field, defined by the general message template, that shall be included in a message to the selected message-destination that corresponds to the first template customization data record, and (ii) at least one message field, defined by the general message template, that shall be excluded from the message to the selected message-destination that corresponds to the first template customization data record; and
a composer application stored in the data storage, wherein the composer application is executable by the processor to apply the first template customization data record to customize the general message template so as to produce a message to be sent to the selected message-destination that corresponds to the first template customization data record, wherein the message to be sent to the selected message-destination comprises the at least one message field, defined by the general message template, that shall be included in a message to the selected message-destination that corresponds to the first template customization data record and excludes the at least one message field, defined by the general message template, that shall be excluded from the message to the selected message-destination that corresponds to the first template customization data record.

2. The wireless handheld device of claim 1, wherein the composer application is further executable to present, via the user interface, at least a portion of the message to the selected message-destination and tailor one or more message fields of the message to the selected message-destination.

3. The wireless handheld device of claim 1, wherein the first template customization data record that corresponds to the selected message-destination indicates for each message field of the plurality of message fields whether or not to include the message field in the message to the selected message-destination.

4. The wireless handheld device of claim 3, wherein the first template customization data record that corresponds to the selected message-destination implicitly indicates whether to include one or more message fields in the message to the selected message-destination.

5. The wireless handheld device of claim 3, wherein the first template customization data record that corresponds to the selected message-destination indicates for each of one or more message fields of the general message template at least one field-property selected from the group consisting of:
   (i) a default value to include in the field,
   (ii) a type of value to include in the field,
   (iii) a restriction on value for the field,
   (iv) how many values to include in the field,
   (v) how many instances of the field to include in the message,
   (vi) whether the field is to be editable by a user, and
   (vii) whether the field is to be presented to the user.

6. The wireless handheld device of claim 5, wherein the default value is a static default value.

7. The wireless handheld device of claim 5, wherein the default value is a dynamic default value.

8. The wireless handheld device of claim 5, wherein the destination data comprises an extensible markup language (XML) script that (i) defines each message-destination of the plurality of message-destinations with a destination ID and an e-mail address, and (ii) defines the template customization data record for each message-destination in the form of one or more XML child elements under the message-destination.

9. The wireless handheld device of claim 1,
   wherein the destination data has a version identifier,
   wherein the wireless handheld device further includes update-logic executable by the processor to send the version identifier to a network server, and
   wherein if an updated version of the destination data exists, the network server responds to the wireless handheld device with the updated version for use by the wireless handheld device.

10. The wireless handheld device of claim 1,
    wherein the destination data includes a respective destination ID for each message-destination of the plurality of message-destinations, and
    wherein each destination ID comprises a network address.

11. The wireless handheld device of claim 1, wherein the selected message-destination is received from the user interface.

12. The wireless handheld device of claim 1,
    wherein the message fields of the general message template are defined using an extensible markup language (XML),
    wherein each of the message fields has one or more attributes defined using the XML, and
    wherein at least one of the attributes indicates whether or not to include the message field in the message to the selected message-destination.

13. The wireless handheld device of claim 1,
    wherein at least one message field of the general message template indicates a minimum number of attachments for the message to the selected message-destination.

14. The wireless handheld device of claim 1, wherein each message-destination of the plurality of message-destinations is defined to have a destination name and a destination address.

15. The wireless handheld device of claim 1,
    wherein at least two message-destinations of the plurality of message destinations correspond to a common template customization data record of the multiple template customization data records, and
    wherein the common template customization data record has a template customization ID and indicates which message fields of the general message template are to be included in messages sent to the at least two message-destinations.

16. The wireless handheld device of claim 1,
    wherein the plurality of template customization data records comprises a second template customization data record that corresponds to a second message-destination of the plurality of message destinations,
    wherein the second template customization data record identifies at least one message field, defined by the general message template, that shall be included in a message to the second message-destination, and
    wherein the at least one message field that shall be included in a message to the second message-destination comprises the at least one message field that shall be excluded from the message to the selected message-destination that corresponds to the first template customization data record.

17. A method comprising:
    maintaining, in data storage of a wireless handheld device, a general message template that defines a plurality of message fields;
    maintaining destination data stored in the data storage but not contained within the general message template, wherein, for a plurality of message destinations, the destination data comprises a plurality of template customization data records, wherein each of the template customization data records has a respective template customization ID, and wherein the destination data specifies for each message-destination of the plurality of message-destinations a template customization ID of a template customization data record that corresponds to that message-destination;
    receiving, via a user interface located at the wireless handheld device, selection from the plurality of message destinations a message-destination to be sent a message, wherein the selected message-destination corresponds to a first template customization data record of the plurality of template customization data records, wherein the first template customization data record identifies (i) at least one message field, defined by the general message template, that shall be included in a message to the selected message-destination that corresponds to the first template customization data record, and (ii) at least one message field, defined by the general message template, that shall be excluded from the message to the selected message-destination that corresponds to the first template customization data record;
    maintaining, in the data storage of the wireless handheld device, a composer application that is executable to apply the first template customization data record to customize the general message template so as to produce a message to be sent to the selected message-destination that corresponds to the first template customization data record, wherein the message to be sent to the selected message-destination comprises the at least one message field, defined by the general message template, that shall be included in a message to the selected message-destination that corresponds to the first template customization data record and excludes the at least one message field, defined by the general message template, that shall be excluded from the message to the selected message-destination that corresponds to the first template customization data record, and executing the composer application of the wireless handheld device to receive the selected message-destination from the user interface of the wireless handheld device and to generate the message to the selected message-destination.

18. The method of claim 17, further comprising:
transmitting the generated message from the wireless handheld device to a network-based messaging server that forwards the generated message to the selected message-destination.

19. The method of claim 17,
wherein at least two message-destinations of the plurality of message destinations correspond to a common template customization data record of the multiple template customization data records, and
wherein the common template customization data record has a template customization ID and indicates which message fields of the general message template are to be included in messages sent to the at least two message-destinations.

20. The method of claim 17,
wherein the plurality of template customization data records comprises a second template customization data record that corresponds to a second message-destination of the plurality of message destinations,
wherein the second template customization data record identifies at least one message field, defined by the general message template, that shall be included in a message to the second message-destination, and
wherein the at least one message field that shall be included in a message to the second message-destination comprises the at least one message field that shall be excluded from the message to the selected message-destination that corresponds to the first template customization data record.

21. A wireless handheld device comprising:
a user interface located at the wireless handheld device;
a processor located at the wireless handheld device;
data storage located at the wireless handheld device;
a general message template that is stored in the data storage and that defines a plurality of message fields;
destination data stored in the data storage, wherein the destination data includes multiple template customization data records, wherein each of the template customization data records has a respective template customization ID and indicates which fields of the general message template are to be included in a message to a message-destination, and wherein the destination data specifies for each message-destination of a plurality of message-destinations a corresponding template customization ID; and
a composer application stored in the data storage and executable by the processor to: (i) receive a message-destination selected from the plurality of message-destinations, (ii) determine from the destination data a particular template customization data record to use for generation of a message to the selected message-destination, wherein the particular template customization data record corresponds to the selected message-destination and indicates which fields of the general message template are to be included in a message to the selected message-destination, and (iii) generate the message to the selected message-destination by customizing the general message template to include just those fields that the particular template customization data record indicates are to be included in a message to the selected message-destination,
wherein at least one field of the general message template indicates a minimum number of attachments and a maximum number of attachments for the message to the selected message-destination, and
wherein the composer application precludes transmission of the message to the selected message-destination unless a user provides a number of attachments between and including the minimum number of attachments and the maximum number of attachments.

22. The wireless handheld device of claim 21, wherein the number of attachments comprises a number of attachments selected from the group consisting of (i) digital image files, (ii) digital video files, and (iii) digital audio files.

* * * * *